(12) United States Patent
Lhuillier

(10) Patent No.: US 7,915,567 B2
(45) Date of Patent: Mar. 29, 2011

(54) HEATED RESISTANCE ESPECIALLY FOR HEATING A SOLID PART SUCH AS A TEMPERATURE PROBE AND/OR A PRESSURE PROBE

(75) Inventor: Bruno Lhuillier, Les Bordes (FR)

(73) Assignee: Auxitrol S.A., Bourges (FR)

( * ) Notice: Subject to any disclaimer, the term of this patent is extended or adjusted under 35 U.S.C. 154(b) by 653 days.

(21) Appl. No.: 10/562,372

(22) PCT Filed: Jun. 24, 2004

(86) PCT No.: PCT/FR2004/001584
§ 371 (c)(1),
(2), (4) Date: Dec. 23, 2005

(87) PCT Pub. No.: WO2005/002281
PCT Pub. Date: Jan. 6, 2005

(65) Prior Publication Data
US 2007/0102412 A1 May 10, 2007

(30) Foreign Application Priority Data
Jun. 27, 2003 (FR) .................................. 03 07792

(51) Int. Cl.
*H05B 3/34* (2006.01)
(52) U.S. Cl. ........................ 219/545; 219/270
(58) Field of Classification Search .................. 219/542, 219/544, 545, 546, 548, 270; 338/22 R, 338/25, 28; 374/120, 140, 148, 135, 137, 374/141
See application file for complete search history.

(56) References Cited

U.S. PATENT DOCUMENTS

| | | | |
|---|---|---|---|
| 2,510,986 A | 2/1949 | Larkin | |
| 4,234,786 A * | 11/1980 | Borom et al. | 219/544 |
| 4,458,137 A | 7/1984 | Kirkpatrick | |
| 4,575,705 A | 3/1986 | Gotcher | |
| 4,909,079 A | 3/1990 | Nishimura et al. | |
| 4,934,831 A * | 6/1990 | Volbrecht | 374/183 |
| 5,046,360 A | 9/1991 | Hedberg | |
| 5,058,195 A | 10/1991 | Knepler | |
| 5,161,894 A | 11/1992 | Bourigault | |
| 5,337,602 A | 8/1994 | Gibson | |
| 5,438,866 A | 8/1995 | McQueen | |
| 5,653,538 A | 8/1997 | Phillips | |
| 5,804,791 A | 9/1998 | Gelus | |
| 6,035,726 A | 3/2000 | Bernerd et al. | |
| 6,134,972 A | 10/2000 | Streckert et al. | |
| 6,250,801 B1 | 6/2001 | Bernard | |
| 6,337,470 B1 | 1/2002 | Von Arx et al. | |
| 6,341,890 B1 | 1/2002 | Vally et al. | |
| 6,880,969 B2 * | 4/2005 | Adachi et al. | 374/185 |

FOREIGN PATENT DOCUMENTS

| | | |
|---|---|---|
| EP | 0930486 | 7/1999 |
| EP | 1243904 | 9/2002 |
| FR | 2149090 | 3/1973 |
| FR | 2208874 | 11/1973 |
| FR | 2539869 | 1/1983 |

(Continued)

*Primary Examiner* — Thor S Campbell
(74) *Attorney, Agent, or Firm* — Blakely, Sokoloff, Taylor & Zafman LLP

(57) ABSTRACT

A heater resistance in particular for heating a solid part. An electric wire, and a ceramic sheath surround the wire. The sheath has a woven layer.

12 Claims, 1 Drawing Sheet

FOREIGN PATENT DOCUMENTS

| | | |
|---|---|---|
| FR | 2728071 | 12/1994 |
| FR | 2808874 | 11/2001 |
| JP | 2001-267046 | 9/2001 |
| WO | WO 98/16837 | 4/1998 |
| WO | WO 00/31508 | 6/2000 |
| WO | WO 00/68651 | 6/2000 |

* cited by examiner

HEATED RESISTANCE ESPECIALLY FOR HEATING A SOLID PART SUCH AS A TEMPERATURE PROBE AND/OR A PRESSURE PROBE

The invention relates to heater resistances, in particular for heating and maintaining the temperature of a solid part. The invention relates in particular to maintaining the temperature of a member such as a probe for measuring a parameter of an air flow, the member being mounted on board a vehicle. The member may be a temperature probe mounted on board an airplane.

Such a member is disclosed, for example, in document FR-2 208 874 in the name of the Applicant. That member seeks to measure the temperature of an air flow entering the jet engine of an airplane. Given the very low temperature of the air flow, in order to prevent ice forming on the measurement probe, a heater resistance is provided that maintains it at a suitable temperature.

It frequently happens that such a resistance is subjected to various deformations in order to enable it to be integrated in the member or while it is being integrated therein. Furthermore, such a resistance may include a ceramic sheath for electrical insulation. Unfortunately, a resistance arranged in that way is capable of accommodating only small amounts of deformation without the sheath breaking and crumbling. Loss of insulator cohesion leads to a loss of electrical insulation and thus to degraded heating properties for the resistance, in turn leading to poor operation of the temperature probe.

An object of the invention is thus to provide a heater resistance that can withstand large amounts of deformation in order to enable it to be integrated on the member to be heated without degrading the heating properties of the resistance.

To this end, the invention provides a heater resistance in particular for heating a solid part, the resistance comprising:
an electric wire; and
a ceramic sheath surrounding the wire;
the sheath comprising a woven layer.

Thus, the woven layer of the ceramic sheath maintains cohesion during the various operations of shaping the assembly. It ensures that the insulation remains cohesive during the manufacturing process even if the resistance is subjected to severe amounts of deformation and shaping. The resistance of the invention thus guarantees continuity of electrical insulation, and consequently guarantees good thermal properties for the resistance.

The resistance of the invention may also present one or more of the following characteristics:
the woven layer comprises threads of alumina ($Al_2O_3$);
the woven layer comprises threads of silica ($SiO_2$);
the woven layer comprises threads of borate ($B_2O_3$);
it further comprises a mass of electrically insulating material, preferably interposed between the wire and the sheath;
the insulating mass is constituted by a mineral, e.g. magnesia (MgO);
it presents a portion of generally elongate shape;
it includes a connector and presents a heater segment and a connection segment adjacent to the connector, the wire having a cross-section in the connection section of area that is greater than the area of the cross-section of the wire in the heater segment; and
it includes a connector and a portion adjacent to the connector that is tapering in shape.

The invention also provides a member, in particular a probe mounted on board a vehicle for measuring an air flow parameter, such as temperature, the member comprising a body and at least one heater resistance of the invention, the heater resistance being secured to the body.

Advantageously, the heater resistance is of a shape that is not plane.

Advantageously, the heater resistance extends at the outside of the body.

Finally, the invention provides a method of fabricating a member, in particular a probe for mounting on board a vehicle for measuring an air flow parameter such as temperature, in which a resistance of the invention is deformed in order to enable it to be secured to a body of the member.

Other characteristics and advantages of the invention appear further on reading the following description of a preferred embodiment and of variants given as non-limiting examples with reference to the accompanying drawing, in which:

FIGS. 1 and 2 show a preferred embodiment of a heater resistance of the invention. The resistance is shown herein in its configuration after fabrication and prior to being deformed for putting into place on a member such as the temperature probe shown in FIG. 3.

Figure 1:
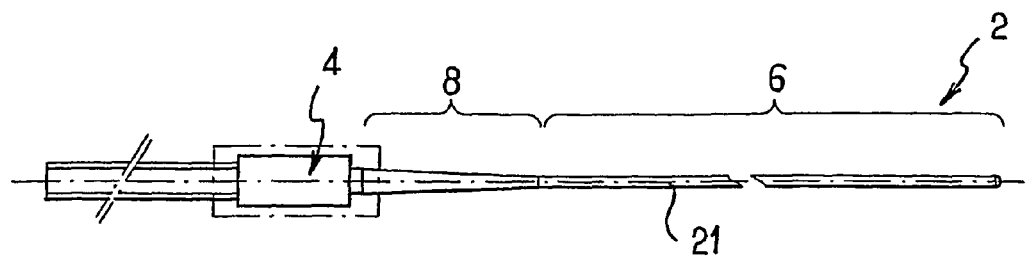
FIG. 1 is a diagrammatic overall view of a heater resistance in a preferred embodiment of the invention after it has been fabricated but before it is deformed.

The resistance 2 comprises an electrical connector 4, a heater segment 6, and a connection segment 8 connecting the connector to the heater segment 6. The connection segment 8 is thus adjacent to the connector 4 and to the heater segment 6.

In the heater segment 6 and the connection segment 8, the resistance comprises an electrically conductive wire 10. The wire 10 may be made of high-purity nickel or of the alloy $Cu_{55}Ni_{45}$. The wire is folded over to form a plurality of strands, each substantially rectilinear in shape and extending parallel to one another in the longitudinal direction 12 of the heater resistance shown in FIG. 1. The heater resistance is elongate in this direction.

The wire 10 is received in an electrically insulating material 14. Specifically it is received in magnesia (MgO), a material that presents excellent electrical insulation properties and that is easily worked. The various strands of the wire 10 are separated from one another by this material. The magnesia material 14 is made up of compacted grains.

In the segments 6 and 8, the resistance further includes an electrically insulating sheath 16 made of ceramic. Specifically, the sheath is constituted by a layer of fabric formed by interleaved threads. In the present example, these threads are threads of alumina ($Al_2O_3$), threads of silica ($SiO_2$), and threads of borate ($B_2O_3$).

In this embodiment, the sheath 16 is in the form of an essentially cylindrical sleeve. The sleeve surrounds the assembly formed by the insulation 14 and the wire 10, except at the terminal end of the heater segment 6, where the insulation 14 is not covered.

Finally, in the segments 6 and 8, the assembly is covered by an outer tube 18 of cylindrical shape, and constituted in this example of nickel. The tube covers the assembly formed by the wire 10, the insulation 14, and the sheath 16. With reference to a longitudinal axis 21 of the heater resistance, the sheath 16 is thus interposed radially between the insulation 14 and the tube 18. The axis 21 corresponds to the neutral fiber of the heater resistance.

In the present example, each strand of wire 10 extends both in the connection segment 8 and in the heater segment 6.

The wire is configured in such a manner that the cross-section of each strand presents an area that is greater in the connection segment 8 than in the heater segment 6. The relatively small area of this section in the heater segment 6 serves in particular to enable the electric wires to produce heating by the Joule effect. In contrast, the relatively larger area of this section in the connection segment 8 serves to a large extent to avoid the Joule effect acting in the segment 8, thus forming a so-called "cold" connection. Because of this difference in area, the connection segment 8 tapers relative to the axis 21 with the smaller section of its taper being contiguous with the heater segment 6 while its lager segment is continuous with the connector 4. In addition, this section of larger area at the connection segment 8 gives this segment greater strength against mechanical stresses and also against thermomechanical stresses, both while the heater resistance is being deformed in the manner described below and while it is in operation.

Figure 3:
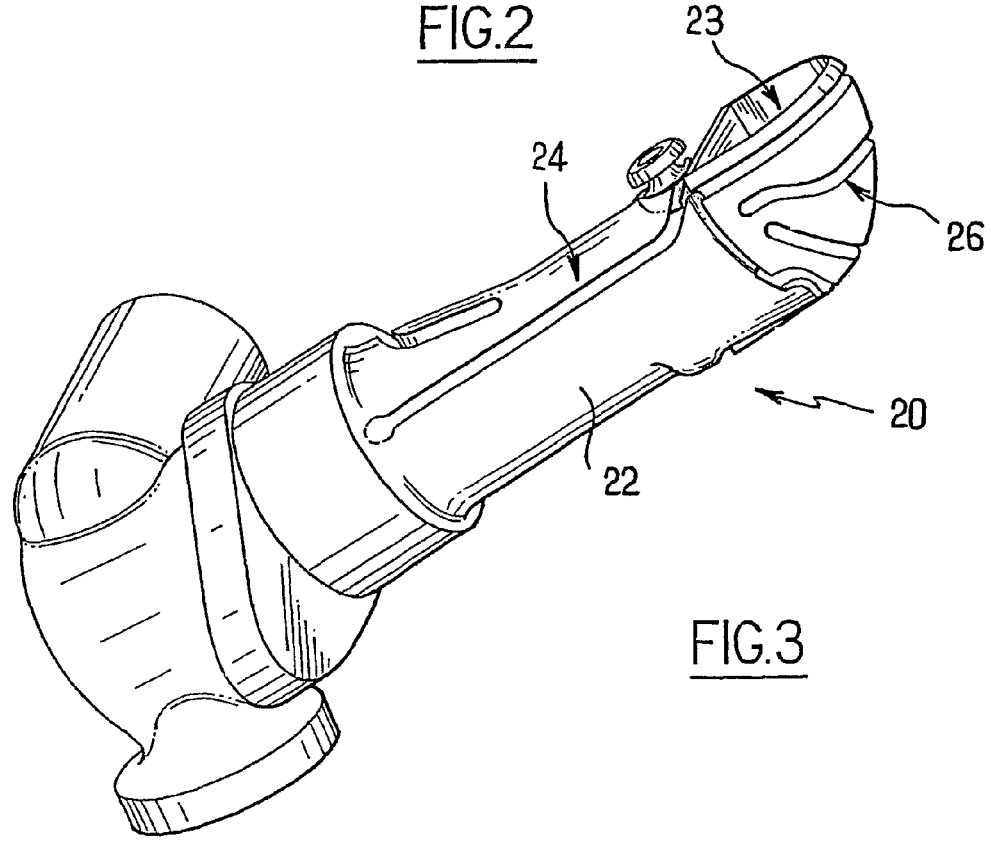
FIG. 3 is a perspective view of a temperature probe for receiving the resistance of FIGS. 1 and 2.

The heater resistance 2 is to constitute a portion of a temperature probe such as the probe 20 shown in FIG. 3. This probe is generally of the type described in document FR-2 808 874 to which reference can be made for further details. This probe 20 comprises a body 22 having an opening 23 into which there penetrates the flow of air whose temperature is to be measured. The probe is mounted on board a vehicle such as an aircraft and serves to measure the temperature of the air penetrating into the jet engine of the aircraft.

An outside face 24 of the body 22 presents grooves 26, some of which are curved and some rectilinear, forming elongate housings in the surface of the body 22. The resistance 2 is to be received in these grooves in contact with the body 22 so as to enable it to be maintained at a given temperature. The resistance 2 is deformed and received in the grooves 26 and is secured therein by brazing.

The excellent mechanical strength of the resistance 2 allows it to be subjected to severe mechanical deformation and consequently allows a variety of shaping techniques to be used such as folding or stretching. Similarly, assembly techniques such as welding or brazing can also be envisaged. It is also possible to use a shaping technique such as swaging. Other techniques could also be used.

Figure 2:
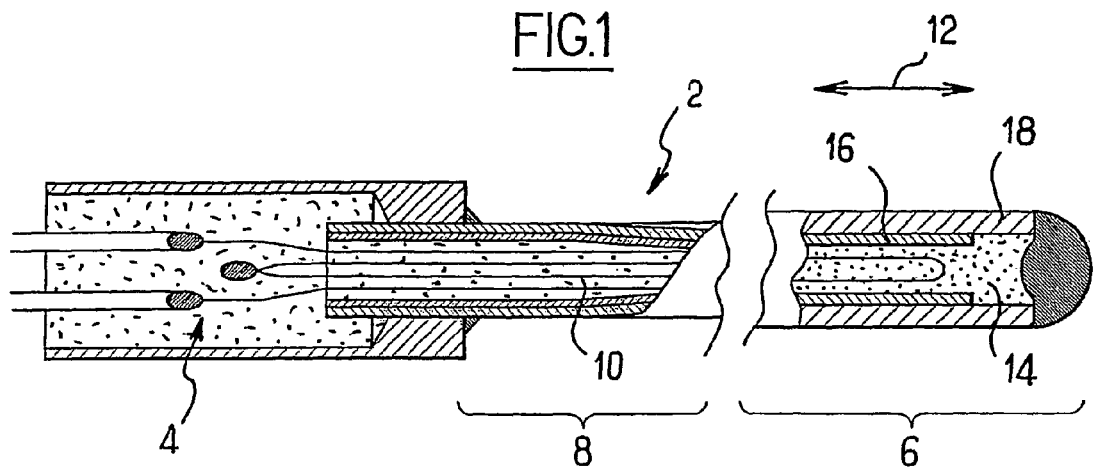
FIG. 2 is a fragmentary view on a larger scale showing the FIG. 1 resistance in section.

Thus, while fabricating the probe, the resistance is used in its initial rectilinear configuration as shown in FIGS. 1 and 2, and it is deformed in order to be received in the grooves 22. During this deformation, the resistance takes up a shape that is not plane, i.e. a shape that is skew. The resistance of the invention can be subjected to stressful working operations (stretching, folding, etc.) and to severe assembly techniques (welding, brazing, adhesive, etc.), while giving it excellent characteristics (dielectric, electrical power) and features (hermetically sealed, ease of assembly). Such a resistance can be used on board aircraft and spacecraft in particular. Other fields of application can also be envisaged.

The connector 4 makes it possible to feed electricity to the resistance once it has been mounted on the probe 20. By means of the resistance the probe 20 can be heated continuously so as to avoid any formation of ice, given the humidity of air and negative temperatures in flight. The resistance 2 extends along the active zone of the probe. The high electrical power traveling along the resistance is transformed into heat and maintains the probe at de-icing temperatures in spite of external temperatures that are very low, e.g. of the order of −50° C., and in spite of high levels of heat dissipation due to heat exchange between the probe and the flow of air in which it is immersed.

The above-described heater resistance provides excellent electrical characteristics, i.e. dielectric strength of up to 10 kilovolts per millimeter (kV/mm) and electrical power of up to 500 watts per meter (W/m). The temperature coefficient of resistance (TCR) enables variation in the resistivity of the heater resistance to be tracked over the range 0° C. to 100° C. This coefficient can be determined experimentally on the basis of the following formula:

$$TCR = \frac{R_{0° C.} - R_{boil}}{T_{boil} \times R_{0° C.}}$$

In the context of the present invention, the TCR lies in the range 0 to 0.0068° C.$^{-1}$.

The presence of the sheath 16 serves to avoid dielectric breakdown occurring in the material 14 between the strands of wire 10 as might otherwise occur while the resistance is being deformed in order to be shaped and installed.

Naturally, numerous modifications could be applied to the invention without going beyond the ambit thereof.

Provision can be made to implement the characteristic whereby the area of the cross-section of the wire 10 is greater in the coupling segment than in the heater segment 6, independently of the sheath 16 being constituted by means of a woven layer.

Furthermore, provision can be made to implement the characteristic whereby the resistance is received in at least one external groove in the body 22 independently of the sheath 16 being constituted by means of a woven layer.

In a variant embodiment, provision could be made to omit the insulating material 14 and replace it by a woven ceramic sheath individually surrounding each strand of wire 10, the assembly being surrounded as above by the sheath 16 of woven ceramic.

Provision could also be made for the ceramic sheath 16 to further comprise, in addition to the woven layer, one or more other woven or non-woven layers.

Although the resistance described herein is located on the outside of the body 22 of the probe 20, provision could be made to use the resistance inside a member that is to be heated.

The invention claimed is:

1. A heater resistance for heating a solid part, the resistance comprising:
   an electric wire within a tube, said wire being folded over to form a plurality of strands, wherein
   the wire is received in an electrically insulating material, such that the plurality of strands are separated from one another by said electrically insulating material; and
   each of the plurality of strands extends both in a connection segment and in an adjacent heater segment, the wire being configured such that the cross-section of each of the plurality of strands presents a greater area in the connection segment than in the heater segment; and
   a ceramic sheath including a woven layer, wherein the sheath surrounds an assembly formed by the wire and the electrically insulating material and is interposed between the assembly and the tube.

2. A heater resistance according to claim 1, wherein the woven layer comprises threads of alumina ($AL_2O_3$).

3. A heater resistance according to claim 1, wherein the woven layer comprises threads of silica ($SiO_2$).

4. A heater resistance according to claim 1, wherein the woven layer comprises threads of borate ($B_2O_3$).

5. A heater resistance according to claim 1 further comprising a mass of electrically insulating material, interposed between the wire and the sheath.

6. A heater resistance according to claim 5, wherein the insulating mass is includes a mineral.

7. A heater resistance according to claim 1, including a portion of generally elongate shape.

8. A heater resistance according to claim 1, further comprising a connector and a portion adjacent to the connector that is tapering in shape.

9. A probe to be mounted on board a vehicle for measuring an air flow parameter, including temperature, the probe comprising a body with an outside face having at least one groove and at least one heater resistance being secured in the at least one groove, wherein the heater resistance comprises:

a tube enclosing a single electric wire, said wire being folded over to form a plurality of strands without contacting the tube, wherein the wire is received in an electrically insulating material, such that the plurality of strands are separated from one another by said electrically insulating material; and a ceramic sheath including a woven layer, wherein the sheath surrounds an assembly formed by the wire and the electrically insulating material and is interposed between the assembly and the tube.

10. A probe according to claim 9, wherein the heater resistance is of a shape that is not plane.

11. A method of fabricating a probe for mounting on board a vehicle for measuring an air flow parameter including temperature, the method comprising deforming a heater resistance according to claim 1 in order to enable the heater resistance to be secured to a body of the probe.

12. A heater resistance according to claim 6, wherein the mineral includes magnesia (MgO).

* * * * *